(12) United States Patent
Chin et al.

(10) Patent No.: US 9,274,383 B2
(45) Date of Patent: Mar. 1, 2016

(54) LIQUID CRYSTAL LENS AND LIQUID CRYSTAL LENS MODULE

(71) Applicant: SILICON TOUCH TECHNOLOGY INC., Hsinchu (TW)

(72) Inventors: Chi-Yuan Chin, Hsinchu (TW); Yan Wu, Hsinchu (TW); Rong-Li Liu, Hsinchu (TW); Ling-Yuan Tseng, Hsinchu (TW); Yong Cao, Hsinchu (TW); Cheng-Chieh Yang, Hsinchu (TW)

(73) Assignee: SILICON TOUCH TECHNOLOGY INC., Hsinchu (TW)

( * ) Notice: Subject to any disclaimer, the term of this patent is extended or adjusted under 35 U.S.C. 154(b) by 34 days.

(21) Appl. No.: 14/171,886

(22) Filed: Feb. 4, 2014

(65) Prior Publication Data

US 2015/0015839 A1    Jan. 15, 2015

(30) Foreign Application Priority Data

Jul. 12, 2013   (TW) .............................. 102125089 A

(51) Int. Cl.
  *G02F 1/1343*   (2006.01)
  *G02F 1/29*   (2006.01)

(52) U.S. Cl.
  CPC ........ *G02F 1/1343* (2013.01); *G02F 1/134309* (2013.01); *G02F 2001/294* (2013.01)

(58) Field of Classification Search
  CPC . G02F 1/29; G02F 2001/294; G02F 2203/28; G02C 7/083; G02C 7/101
  See application file for complete search history.

(56) References Cited

U.S. PATENT DOCUMENTS

| 8,194,228 | B2 | 6/2012 | Sato et al. | |
|---|---|---|---|---|
| 2002/0145701 | A1* | 10/2002 | Sun et al. | 349/200 |
| 2006/0215107 | A1* | 9/2006 | Horiuchi et al. | 349/200 |
| 2008/0266473 | A1* | 10/2008 | Osawa et al. | 349/33 |
| 2011/0025955 | A1* | 2/2011 | Bos et al. | 349/95 |

FOREIGN PATENT DOCUMENTS

| JP | 2006267150 A | 10/2006 |
|---|---|---|
| JP | 2008076926 A | 4/2008 |
| JP | 2010009584 A | 1/2010 |
| JP | 2010127976 A | 6/2010 |
| KR | 20120096194 A | 8/2012 |

* cited by examiner

*Primary Examiner* — Jessica M Merlin
(74) *Attorney, Agent, or Firm* — Li & Cai Intellectual Property (USA) Office

(57) ABSTRACT

A liquid crystal lens includes a liquid crystal layer and at least two driving electrode plates. The liquid crystal layer is arranged between the driving electrode plates. Each of the driving electrode plates includes a transparent substrate, a circuit layer, an insulating layer, an electrode layer, at least a conducting pillar and an alignment layer. The transparent substrate has a surface, and the circuit layer is atop the surface. The conducting pillar is arranged in the insulating layer and connected to the electrode layer and the circuit layer. The alignment layer contacts the liquid layer. The electrode layer is interposed between the alignment layer and the insulating layer. The electrode layer in at least one of the driving electrode plates includes at least two ring-shaped electrodes.

8 Claims, 4 Drawing Sheets

LIQUID CRYSTAL LENS AND LIQUID CRYSTAL LENS MODULE

BACKGROUND

1. Technical Field

The present invention relates to a lens and a lens module; in particular, to a liquid crystal lens and a liquid crystal lens module.

2. Description of Related Art

The liquid crystal lens is a lens which can change its focal length. The liquid crystal lens includes a liquid crystal layer, a pair of alignment layers, and a pair of electrode layers. The alignment layers position on the different sides of the liquid crystal layer respectively. The alignment layers can arrange the liquid crystal molecules of the liquid crystal layer in a predetermined way. The electrode layers are positioned on the different sides of the alignment layers respectively.

While the liquid crystal lens is in use, the voltage signal is applied to the electrode layers, so as to generate an electric field between electrode layers positioned on two sides of the liquid crystal layer. The electric field can control the rotation of the liquid crystal molecules in the liquid crystal layer. Thus, the rotated liquid crystal molecules can generate the effect similar to the optical lens. While light passes through the liquid crystal lens, light is affected by the arrangement of the liquid crystal molecules.

SUMMARY

The present invention provides a liquid crystal lens. While light passes through the liquid crystal lens, the liquid crystal lens generates similar effect as the optical lens.

The present invention provides a liquid crystal lens module. The liquid crystal lens module includes two adjacent liquid crystal lenses mentioned above.

The present invention provides a liquid crystal lens including a liquid crystal layer and at least two adjacent driving electrode plates to hold the liquid crystal layer. Each of the driving electrode plates includes a transparent substrate, a circuit layer, an insulating layer, an electrode layer, a plurality of conducting pillars, and an alignment layer. The transparent substrate includes a surface. The circuit layer is deposited on the surface. The insulating layer is disposed on and covers the circuit layer. The electrode layer is deposited on the insulating layer. The conducting pillars are positioned inside the insulating layer and connected to the electrode layer and the circuit layer. The alignment layer contacts the liquid crystal layer. The electrode layer is interposed between the alignment layer and the insulating layer. Besides, the electrode layer of at least one of the driving electrode plates includes at least two ring-shaped electrodes. One of the ring-shaped electrodes encircles the other ring-shaped electrode. The two ring-shaped electrodes have the same geometric center.

The present invention provides a liquid crystal lens module including two adjacent liquid crystal lenses mentioned above. Each of the liquid crystal lenses includes a liquid crystal layer and at least two adjacent driving electrode plates, so as to hold the liquid crystal layer. Each of the driving electrode plates includes a transparent substrate, a circuit layer, an insulating layer, an electrode layer, a plurality of conducting pillars, and an alignment layer. The transparent substrate includes a surface. The circuit layer is deposited on the surface. The insulating layer covers the circuit layer. The electrode layer is deposited on the insulating layer. The conducting pillars are positioned inside the insulating layer and connected to the electrode layer and the circuit layer. The alignment layer contacts the liquid crystal layer. The electrode layer are interposed between the alignment layer and the insulating layer. Besides, the electrode layer of at least one of the driving electrode plates includes at least two ring-shaped electrodes. One of the ring-shaped electrodes encircles the other ring-shaped electrode. The two ring-shaped electrodes have the same geometric center.

To sum up, the present invention provides a liquid crystal lens and a liquid crystal lens module. The driving electrode plate of the liquid crystal lens includes a circuit layer and an electrode layer. The circuit layer electrically connects to the electrode layer by utilizing the conducting pillars. The circuit layer and the electrode layer are positioned on different layers, thus the layout of the traces on the circuit layer would not limit to the design or the shape of the electrodes on the electrode layer.

In order to further appreciate the characteristic and technical contents of the present invention, references are hereunder made to the detailed descriptions and appended drawings in connection with the present invention. However, the appended drawings are merely shown for exemplary purpose rather than being used to restrict the scope of the present invention.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1A:
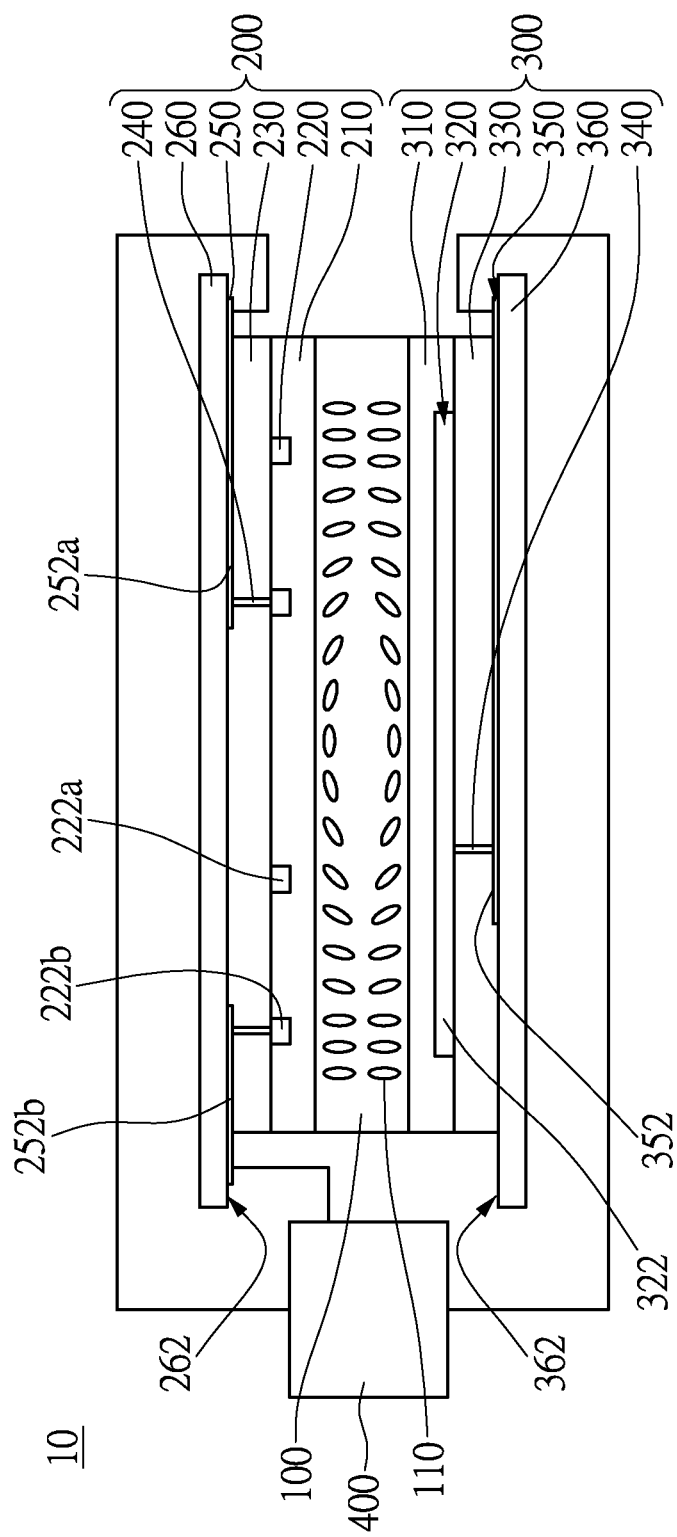
FIG. 1A is a cross-section view of a liquid crystal lens in accordance with the first embodiment of the instant disclosure.

FIG. 1A is a cross-section view of a liquid crystal lens 10 in accordance with the first embodiment of the instant disclosure. Referring to FIG. 1A, the liquid crystal lens 10 includes a liquid crystal layer 100, at least two driving electrode plates and at least an external power supply 400. The driving electrode plates are the main driving electrode plate 200 and the assisting driving electrode plate 300. The main driving electrode plate 200 and the assisting driving electrode plate 300 are positioned on two sides of the liquid crystal layer 100. In other words, the liquid crystal layer 100 is arranged between the main electrode plate 200 and the assisting driving electrode plate 300.

Specifically, the main driving electrode plate 200 includes a transparent substrate 260, a circuit layer 250, a plurality of conducting pillars 240, an insulating layer 230, an electrode layer 220, and an alignment layer 210. The transparent substrate 260 includes a surface 262. The circuit layer 250 is deposited on the surface 262. The circuit layer 250 includes two traces 252a, 252b. The insulating layer 230 covers the circuit layer 250 and the surface 262. The insulating layer 230 can avoid short circuiting between the traces. The electrode layer 220 is deposited on the insulating layer 230. The electrode layer 220 includes at least two ring-shaped electrodes 222a, 222b. The number of the ring-shaped electrode is equal to the number of the trace. In addition, the ring-shaped electrode 222b can encircles the other ring-shaped electrode 222a. The ring-shaped electrodes 222a, 222b have the same geometric center C. The distance between inner diameter of the ring-shaped electrode 222b and outer diameter of the other ring-shaped electrode 222a is 0.1 mm. Nevertheless, the present invention doesn't limit to the distance between the ring-shaped electrodes 222a and 222b.

The conducting pillars 240 are positioned inside the insulating layer 230 and electrically connected to the electrode layer 220 and the circuit layer 250. Specifically, the ring-shaped electrode 222a electrically connects with the trace 252a by the conducting pillars 240 and the ring-shaped electrode 222b electrically connects with the trace 252b by the conducting pillars 240. In other words, in the present invention, the traces 252a, 252b and the ring-shaped electrodes 222a, 222b are deposited on different layers. Thus, the layout of the traces 252a, 252b on the circuit layer 250 would not limit to the design or the shape of the ring-shaped electrodes 222a, 222b on the electrode layer 220.

Figure 1B:
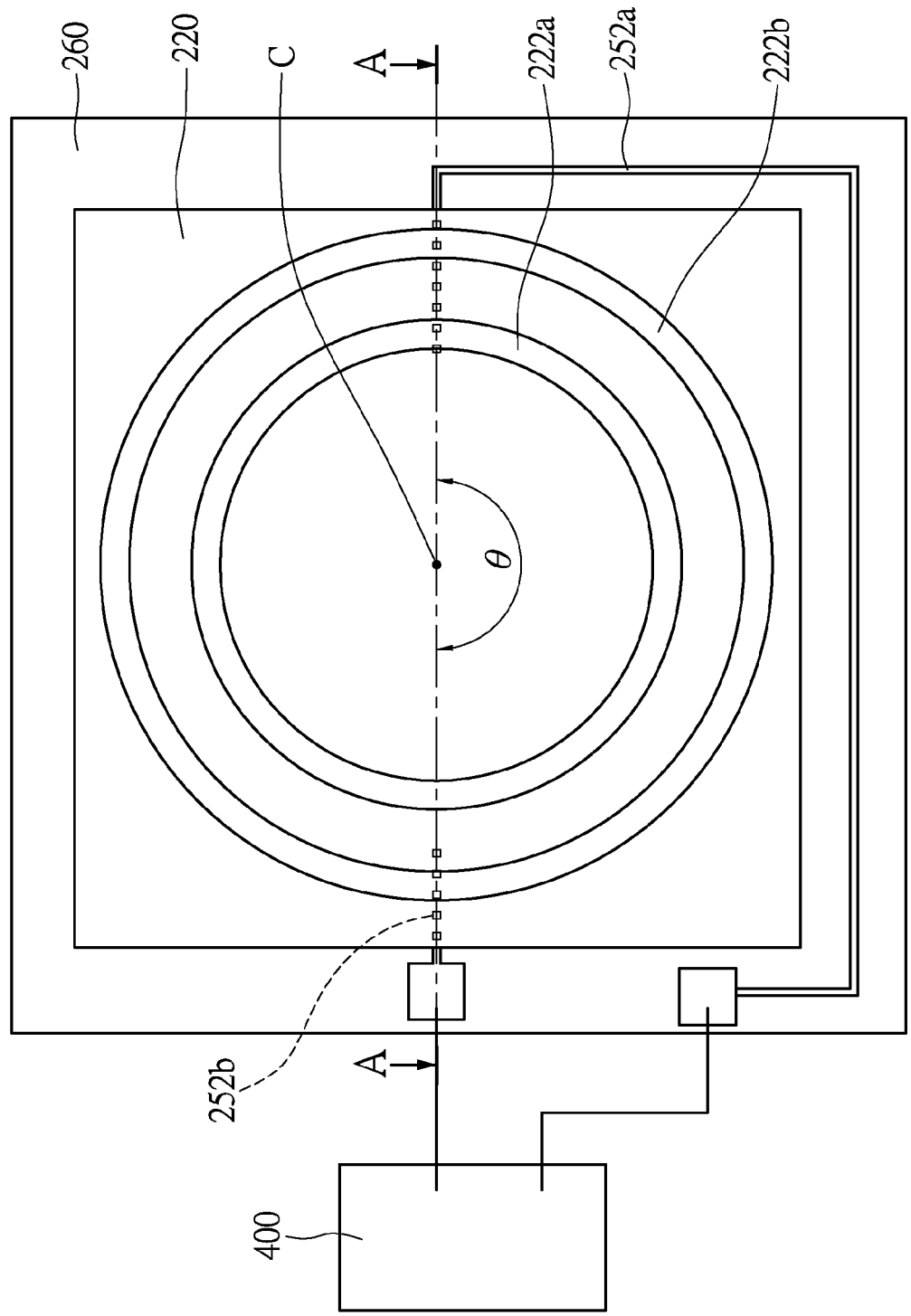
FIG. 1B is a layout schematic diagram of one of the electrode layer in FIG. 1A.

Referring to FIG. 1B, FIG. 1B is a layout schematic diagram of one of the electrode layer in FIG. 1A. It's worth noting that, the following description is about the ring-shaped electrodes 222a and 222b of the main driving electrode plate 200 in the present embodiment, thus FIG. 1B only show the electrode layer 220, the circuit layer 250, the transparent substrate 260 and the external power supply 400. In addition, the cross-section view of liquid crystal lens 10 in FIG. 1A is provided based on a section line A-A cutting through the liquid crystal lens 10 as shown in FIG. 1B.

As shown in FIG. 1B, the ring-shaped electrode 222b encircles the other ring-shaped electrode 222a. The ring-shaped electrode 222a and ring-shaped electrode 222b have the same geometric center C. In addition, the ring-shaped electrode 222a is electrically connected to the trace 252a of the circuit layer 250 and other the ring-shaped electrode 222b electrically connects with the trace 252b of the circuit layer 250. It's worth noting that, the two traces 252a, 252b of the ring-shaped electrodes 222a, 222b distribute in the isometric way about the geometric center C. The number of the trace is two, thus the angle $\theta$ between the traces 252a and 252b is 180 degree. The traces 252a, 252b are distributed in the isometric way, thus the traces 252a, 252b do not gather at the same side. The traces 252a, 252b connect to the power supply from different positions. While the external power supply 400 supplies the voltage to the ring-shaped electrodes 222a, 222b, the effect of the non-uniform electric field caused by the concentrated voltage can be reduced.

Referring to FIG. 1A, the alignment layer 210 deposits on the insulating layer 230 and covers the insulating layer 230 and the electrode layer 220. The ring-shaped electrodes 222a and 222b are interposed between the insulating layer 230 and the alignment layer 210. In addition, the alignment layer 210 contacts the liquid crystal layer 100, so as to make the liquid crystal molecules 110 of the liquid crystal layer 100 arrange in the predetermined way.

Moreover, the structure of the assisting driving electrode plate 300 is similar to the structure of the main driving electrode plate 200. The assisting driving electrode plate 300 also includes a transparent substrate 360, a circuit layer 350, a plurality of conducting pillars 340, an insulating layer 330, an electrode layer 320, and an alignment layer 310. The arranged method of each layer is omitted thereof. However, different from the main driving electrode plate 200, in the present embodiment, the electrode layer 320 only includes an electrode 322 and the circuit layer 350 only includes a trace 352. The electrode 322 electrically connects to the trace 350 via the conducting pillar 340. In the present embodiment, the trace 352 and the electrode 322 are in the different layers, thus the layout of the trace 352 on the circuit layer 350 would not limit to the design or the shape of the electrode 322 on the electrode layer 320.

The external power supply 400 electrically connects to the circuit layers 250, 350. The external power supply 400 controls the electrode 322 via the trace 352 and controls the ring-shaped electrodes 222a, 222b by the traces 252a, 252b, so as to generate the electric field between the electrode 322 and the ring-shaped electrodes 222a, 222b. Thus, the liquid crystal molecules 110 of the liquid crystal layer 100 are rotated by the influence of the electric field. As shown in FIG. 1A, in the present embodiment, the shape of electrode in the electrode layer 220 is ring-shaped. Once voltage is applied, the refractive index of the liquid crystal molecules 110 can be changed to resemble the optical effect similar to the convex lens. In addition, the curve ratio of the arranged liquid crystal molecules 110 can be controlled by the supplying voltage.

It's worth noting that, in other embodiment, the electrode 322 can be the ring-shaped electrode, and the number of the electrode 322 can be more than one. The present invention is not limit to the number of the electrode 322. The number of the trace 352 can be the same as the number of the electrode 322. While the electrode 322 is the ring-shaped electrode, the layout method of the trace 352 can be the same as the layout method of the traces 252a, 252b in the main driving electrode plate 200.

Figure 1C:
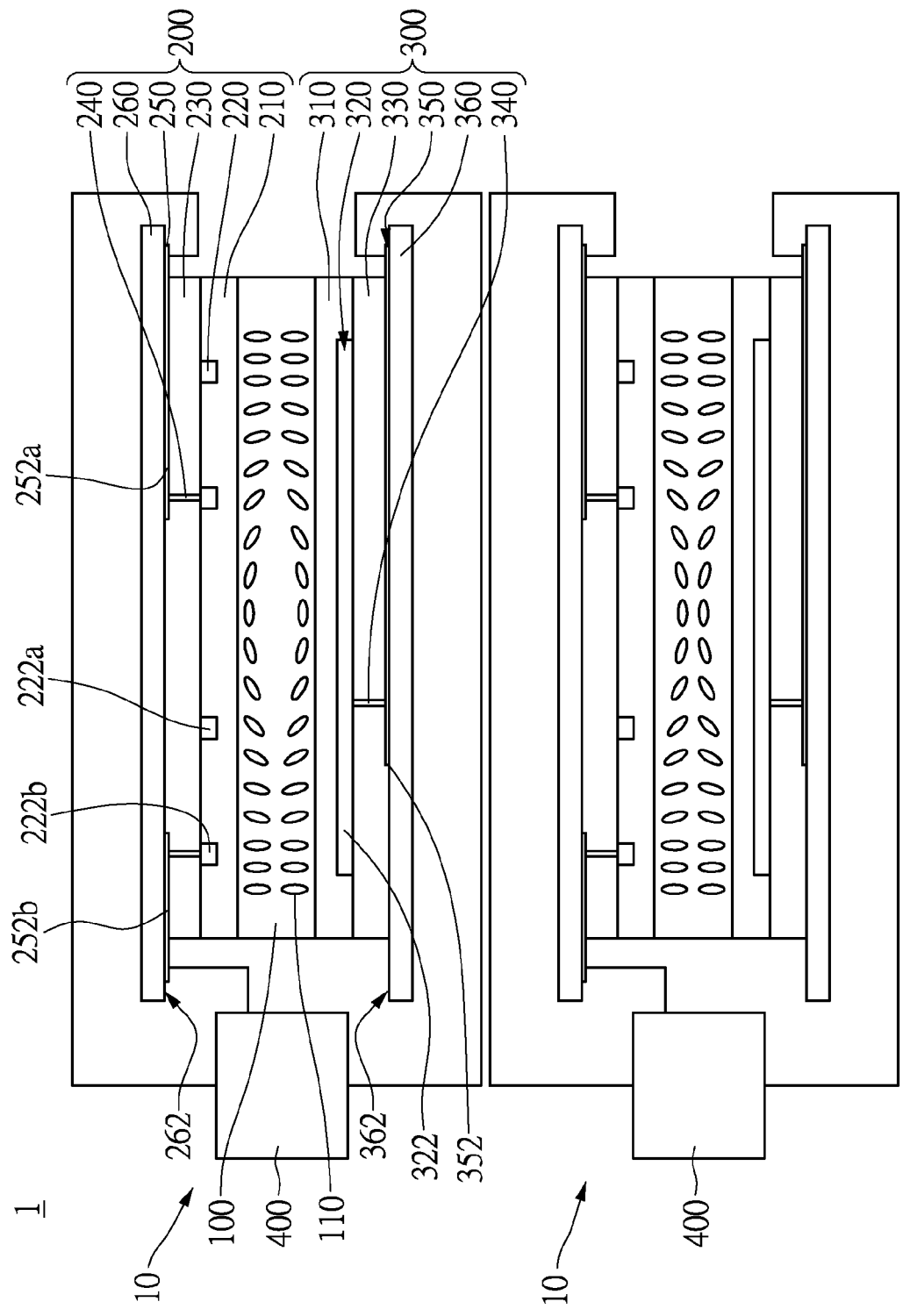
FIG. 1C is a cross-section view of a liquid crystal lens module in accordance with the first embodiment of the instant disclosure.

Next, referring to FIG. 1C, FIG. 1C is a cross-section view of a liquid crystal lens module 1 in accordance with the first embodiment of the instant disclosure. In actual operation, the single liquid crystal lens 10 might encounter issue regarding birefringence, thus the user can improve the problem by utilizing the liquid crystal lens module 1. Referring to FIG. 1C, in the present embodiment, the liquid crystal lens module 1 includes two adjacent liquid crystal lenses 10. In other embodiment, the two liquid crystal lenses 10 are arranged in the transmitting path of a light.

The structure of the each of the liquid crystal lenses 10 is similar to the above mentioned and the description of the liquid crystal lenses 10 are omitted thereof. In actual operation, the external power supply 400 is utilized to drive the liquid crystal molecules of the two liquid crystal lens 10 to arrange in different form. For instance, the external power supply 400 can control the liquid crystal lens 10. The refractive index of the liquid crystal molecules 110 in the liquid crystal lens 10 near the light source is changed to resemble the optical effect similar to the concave lens. On the other hand, the refractive index of the liquid crystal molecules 110 in liquid crystal lens 10 away from the light source is changed to resemble the optical effect similar to the convex lens. Therefore, issue regarding birefringence can be eliminated. In addition, in other embodiment, the liquid crystal lens module can also include a liquid crystal lens and a polarizer to eliminate issue regarding birefringence. The present invention doesn't limit the method to eliminate issue regarding birefringence.

It's worth noting that, the liquid crystal lens 10 can generate the effect similar to the optical lens by changing the rotation of the liquid crystal molecules 110. While light passes through the liquid crystal lens 10, the liquid crystal lens 10 can converge or diverge the light. Thus, in the present embodiment, the material of every one of the layers in the liquid crystal lens 10 can choose the transparent material, so as to allow light to pass through the liquid crystal lens 10. For example, the material of the insulating layers 230, 330 can be the silicon nitrogen compound (SiNx), silicone compound (SiOx), resin, polyimide, organic insulating material, or an inorganic insulating material. The material of the alignment layers 210, 310 can be polyimide.

In addition, the material of the traces 252a, 252b, 352, the electrodes 222a, 222b, 322 and the conducting pillars 240, 340 can be gold, copper, aluminum, conductive metal, conductive alloy, or compound conductive layer with multiple metal layers, such as chromium copper, or aluminum molybdenum. Moreover, the material of the traces 252a, 252b, 352, the electrodes 222a, 222b, 322 and the conducting pillars 240, 340 can be a transparent conductive material, such as indium tin oxide (ITO), indium zinc oxide (IZO), or indium gallium zinc oxide (IGZO). However, the present invention is not limit thereof.

In addition, a thickness of every one of the layers in the liquid crystal lens 10 can also influence the effect of the light passing through the liquid crystal lens 10 and the intensity of the electric field driving the liquid crystal molecules 110. In the present embodiment, a thickness of both the insulating layers 230, 330 are 20-25 nm, and the thickness of both the alignment layers 210, 310 are 35-40 nm. However, the present invention is not limited thereof.

Figure 2:
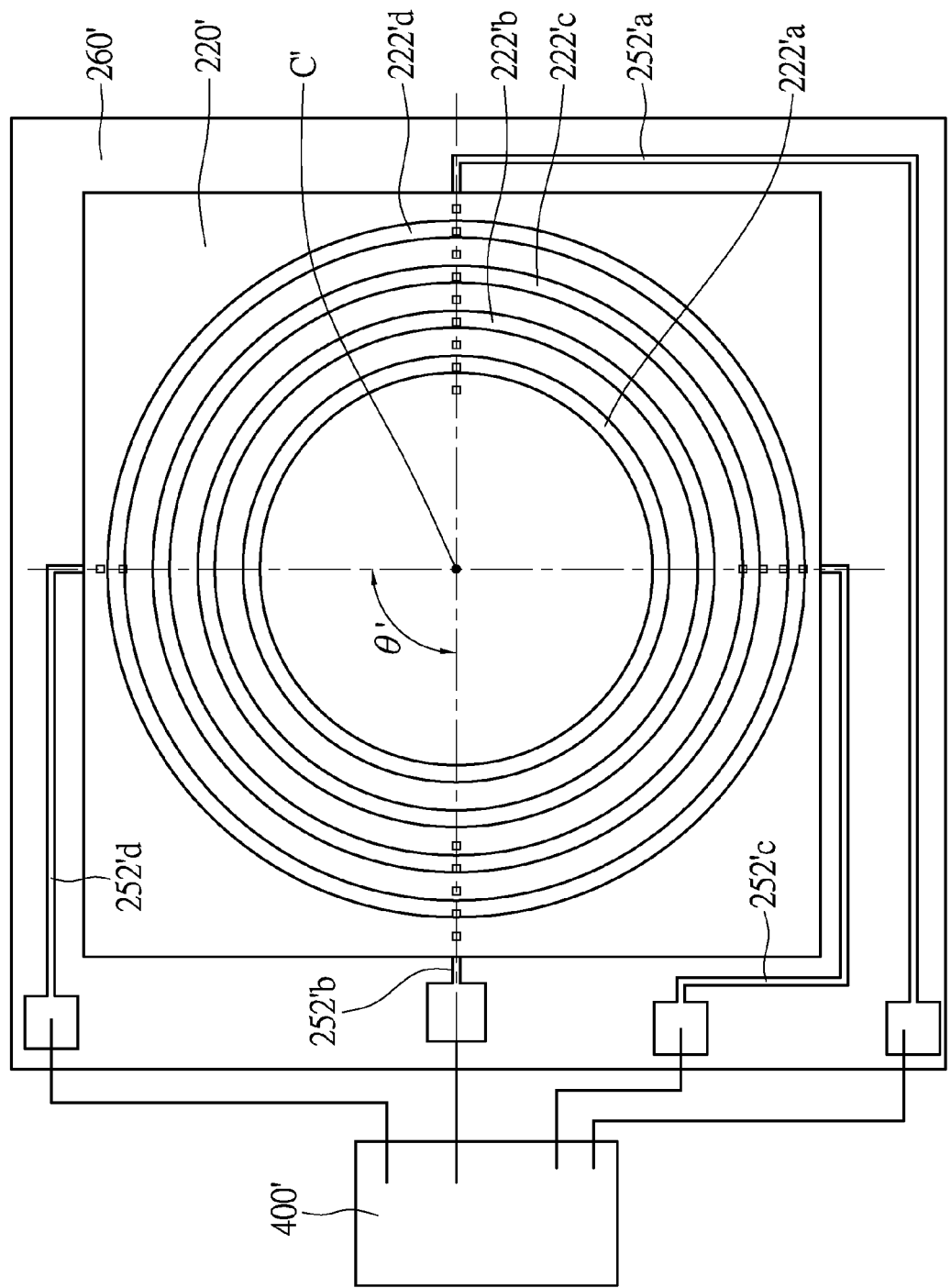
FIG. 2 is a top view of the electrode layer in accordance with the second embodiment of the instant disclosure.

FIG. 2 is a top view of the electrode layer 220' in accordance with the second embodiment of the instant disclosure. Different from the previous embodiment, in the present embodiment, the electrode layer 220' includes a plurality of ring-shaped electrodes 222'a, 222'b, 222'c, 222'd. The circuit layer 250' includes a plurality of traces 252'a, 252'b, 252'c, 252'd (FIG. 2 demonstrates four ring-shaped electrodes and four traces). The ring-shaped electrodes 222'a, 222'b, 222'c, 222'd are electrically connected to the traces 252'a, 252'b, 252'c, 252'd by the conducting pillars. The external power supply 400' is electrically connected to the traces 252'a, 252'b, 252'c, 252'd to supply voltage to the ring-shaped electrodes 222'a, 222'b, 222'c, 222'd. Thus, the liquid crystal molecules 110 are driven to rotate.

As shown in FIG. 2, the ring-shaped electrode 222'd encircles the ring-shaped electrode 222'c, the ring-shaped electrode 222'c encircles the ring-shaped electrode 222'b, and the ring-shaped electrode 222'b encircles the ring-shaped electrode 222'a. In other words, the four ring-shaped electrodes 222'a, 222'b, 222'c, 222'd have the same geometric center C'. The traces 252'a, 252'b, 252'c, 252'd distribute in the isometric way about the geometric center C'. In other words, the number of the traces is four, and the angle θ' between the adjacent traces is 90 degree. Similarly, while the number of the ring-shaped electrode is n, the angle θ' between the adjacent traces is 360/n degree. Hereinafter, the n is positive integer greater than 2.

Furthermore, the traces 252'a, 252'b, 252'c, 252'd are distributed in the isometric way, thus the traces 252'a, 252'b, 252'c, 252'd do not gather at the same side. The traces 252'a, 252'b, 252'c, 252'd are connected to the power supply from different positions. While the external power supply 400 supplies voltage to the ring-shaped electrodes 222'a, 222'b, 222'c, 222'd, non-uniform electric field caused by the concentrated voltage can be reduced. Moreover, in the present embodiment, the distance between the outer diameter of the ring-shaped electrodes 222'a, 222'b, 222'c, 222'd and the inner diameter of the adjacent ring-shaped electrodes 222'b, 222'c, 222'd is 0.1 mm respectively. Nevertheless, in the other embodiment, the distance between the adjacent ring-shaped electrodes can be different. The distance may depended on the design of the lens. The present invention is not limit thereto.

To sum up, the present invention provides a liquid crystal lens and a liquid crystal lens module. The liquid crystal lens includes a main driving electrode plate. The main driving electrode plate includes a circuit layer and an electrode layer. The circuit layer is electrically connected to the electrode layer by the conducting pillars. The circuit layer includes two traces. The electrode layer includes two ring-shaped electrodes. The circuit layer and the electrode layer is deposited on different layers, thus the layout of the traces on the circuit layer would not limit to the design and the shape of the electrodes on the electrode layer. Furthermore, the traces distribute in the isometric way about the geometric center, thus the traces do not gather at the same side. While the external power supply supplies the voltage to the ring-shaped electrodes, the effect of the non-uniform electric field caused by the concentrated voltage can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal lens comprising:
   a liquid crystal layer;
   at least two driving electrode plates, wherein the liquid crystal layer is arranged between the adjacent driving electrode plates, and each of the driving electrode plates comprising:
   a transparent substrate comprising a surface;
   a circuit layer deposited on the surface;
   an insulating layer covering the circuit layer;
   an electrode layer deposited on the insulating layer;
   at least a conducting pillar arranged in the insulating layer, the pillar connected to the electrode layer and the circuit layer; and
   an alignment layer abutting the liquid crystal layer, wherein the electrode layer is interposed between the alignment layer and the insulating layer, wherein the electrode layer of at least one of the driving electrode plates comprises at least two ring-shaped electrodes, one of the ring-shaped electrodes encircles the other ring-shaped electrode, and the ring-shaped electrodes have the same geometric center;
   wherein the circuit layer of one of the at least two driving electrode plates comprises n ring-shaped electrodes and n traces, the ring-shaped electrodes connect to the traces respectively, and the traces distribute in an isometric way about the geometric center, wherein n is positive integer and is larger than 2, and the angle between two adjacent traces is 360/n degree.

2. The liquid crystal lens of claim 1, wherein each of the insulating layer of the driving electrode plate has a thickness of about 20-25 nm.

3. The liquid crystal lens of claim 1, wherein each of the alignment layer of the driving electrode plate has a thickness of about 35-40 nm.

4. The liquid crystal lens of claim 1, wherein a distance between an outer diameter of one of the ring-shaped electrode and an inner diameter of the adjacent ring-shaped electrode is about 0.1 mm, the outer diameter is smaller than the inner diameter.

5. A liquid crystal lens module comprising two liquid crystal lenses, the liquid crystal lenses arranged in the transmitting path of a light source, wherein the liquid crystal lens comprising:
   a liquid crystal layer;

at least two driving electrode plates, wherein the liquid crystal layer is arranged between the two adjacent driving electrode plates, and each of the driving electrode plate comprising:

a transparent substrate comprising a surface;

a circuit layer deposited on the surface;

an insulating layer covering the circuit layer;

an electrode layer deposited on the insulating layer;

at least a conducting pillar arranged in the insulating layer and connected to the electrode layer and the circuit layer; and an alignment layer abutting the liquid crystal layer, wherein the electrode layer is interposed between the alignment layer and the insulating layer, wherein the electrode layer of at least one of the driving electrode plates comprises at least two ring-shaped electrodes, one of the ring-shaped electrodes encircles the other ring-shaped electrode, and the ring-shaped electrodes have the same geometric center;

wherein the circuit layer of one of the at least two driving electrode plates comprises n ring-shaped electrodes and n traces, the ring-shaped electrodes connect to the traces respectively, and the traces distribute in an isometric way about the geometric center, wherein n is positive integer and is larger than 2, and the angle between two adjacent traces is 360/n degree.

6. The liquid crystal lens module of claim 5, wherein each of the insulating layer of the driving electrode plate has a thickness of about 20-25 nm.

7. The liquid crystal lens module of claim 5, wherein each of the alignment layer of the driving electrode plate has a thickness of about 35-40 nm.

8. The liquid crystal lens module of claim 5, wherein the distance between an outer diameter of one of the ring-shaped electrodes and an diameter of the adjacent ring-shaped electrode is about 0.1 mm, the outer diameter is smaller than the inner diameter.

* * * * *